US006670562B2

(12) United States Patent
Kaneko

(10) Patent No.: US 6,670,562 B2
(45) Date of Patent: Dec. 30, 2003

(54) MULTI STAGE AND MULTI DIRECTION KEY AND MULTI STAGE AND MULTI DIRECTION KEY SWITCH USING THE SAME

(75) Inventor: Takehiro Kaneko, Souwa-machi (JP)

(73) Assignee: Sunarrow Ltd., Tokyo (JP)

( * ) Notice: Subject to any disclaimer, the term of this patent is extended or adjusted under 35 U.S.C. 154(b) by 0 days.

(21) Appl. No.: 10/189,290

(22) Filed: Jul. 3, 2002

(65) Prior Publication Data

US 2003/0010609 A1 Jan. 16, 2003

(30) Foreign Application Priority Data

Jul. 16, 2001 (JP) ....................................... 2001-214950

(51) Int. Cl.[7] ................................................ H01M 13/70
(52) U.S. Cl. ......................... 200/1 B; 200/512; 200/516
(58) Field of Search ................................. 200/1 B, 5 R, 200/6 A, 17 R, 18, 512, 341–345

(56) References Cited

U.S. PATENT DOCUMENTS 5,536,911 A * 7/1996 Madill ......................... 200/6 A
5,952,629 A * 9/1999 Yoshinaga et al. .......... 200/5 A
6,303,887 B1 * 10/2001 Ando ......................... 200/512

* cited by examiner

*Primary Examiner*—Elvin Enad
*Assistant Examiner*—M. Fishman
(74) *Attorney, Agent, or Firm*—Hedman & Costigan, P.C.

(57) ABSTRACT

An end of the present invention is to make it possible to input multi-valued signals by a manipulation to incline a key in a multi-direction-operative key switch, and disclosed is a structure of a multi-direction-operative key fitting to the end of the present invention. The multi-direction-operative key includes: a key top made of hard resin; a key base made of rubber-like elastic body loading the key top on its surface; and a plurality of switch thrusting projections, each of which is made of the same material as that of the key base and extends vertically from a rear surface of the key base opposite to the surface loading the key top, wherein the switch thrusting projections are respectively provided at the position just below the center of the key top and at intersection points of a plurality of concentric circles surrounding the center of the key top and radii of the key top in its inclination directions, and lengths of the switch thrusting projections in the inclination directions are made to be different for the concentric circles.

7 Claims, 4 Drawing Sheets

MULTI STAGE AND MULTI DIRECTION KEY AND MULTI STAGE AND MULTI DIRECTION KEY SWITCH USING THE SAME

BACKGROUND OF THE INVENTION

1. Field of the Invention

The present invention relates to a multi-direction-operative key switch used as a scroll key and a navigation button in electronic appliances such as portable telephones, and to a new structure of a multi-direction-operative key that is a push button mechanism of the multi-direction-operative key switch.

2. Descriptions of the Related Art

"A multi-direction-operative key switch" is a composite switch which is capable of inverting on/off a switch element by tilting a key forward and backward or to the left and right as well as by pushing the key vertically, and which operates a plurality of switch elements separately by a single key. If specified functions are respectively allocated to the respective switch elements, a manipulation for selecting and determining one or more functions among the plural functions can be speedily performed with one fingertip.

"A multi-direction-operative key" is a push button mechanism for manipulating the multi-direction-operative key switch. The multi-direction-operative key is a part of a component called "a key sheet" that is an aggregate composed of many keys. The multi-direction-operative key is combined with a printed-circuit board and the like, on the surface of which many switch elements are arranged, whereby "a multi-direction-operative key switch" is formed on the portion of the key sheet and the printed-circuit board.

The multi-direction-operative key is composed of "a key top" that is a portion manipulated directly by a finger, and a flexible "key base" that transmits a motion of the key top to the switch elements while keeping the key top at a predetermined position. On a lower plane of the key base, a switching pressurizing projection so called a thruster is respectively formed by one at a position just below the center of the key top and at a position slanted from the key.

The printed-circuit board and the like, which are combined with this multi-direction-operative key, are provided so as to contact with the lower plane of the key base, and the switch elements are arranged at the respective positions facing the tips of the switching pressuring projections. Note that these switch elements should transmit its slight vibrations called a click feeling to the key top so that the finger can feel the operation.

On the other hand, there has been a multi-direction-operative key based on an operation principle different from that of the foregoing one, which is called, for example, an analog input type. For example, the one which detects the key's motion as a change of electrostatic capacitance. This kind of multi-direction-operative key detects the motion of the key as continuous variables not as binaries of on and off. Moreover, this multi-direction-operative key can detects not only the motion in the forward and backward directions and in left and right directions but also the slant motion in any direction. Focusing attention on such characteristics, the multi-direction-operative key is used for joysticks for game machines. However, in terms of its structure, it is impossible to make the operator feel the click feeling by adding elements such as metal domes, and it cannot be estimated that this multi-direction-operative key is suitable for portable telephones and the like. Note that, in contrast with this analog input type key, the one using the switch elements is sometimes called "a contact-having multi-direction-operative key (switch)".

Since the conventional contact-having multi-direction-operative key switch has only one switch element in each direction in which the key inclines, only binary signals having [0,1] as a variable range in that direction can be input. Moreover, different result cannot be obtained even if the key is inclined either rapidly or slowly, and a speed at which the key is inclined cannot be used as a signal. On the other hand, though there is no such a limitation in the analog input type key, the analog input type key is not suitable for the portable telephone and the like as described above.

SUMMARY OF THE INVENTION

An end of the present invention is to provide an improved contact-having multi-direction-operative key switch which is capable of inputting multi-valued signals thereto by slanting operation of a key. Another object of the present invention is to propose a structure of a multi-direction-operative key suitable for this end.

The end of the present invention is achieved by a multi-direction-operative key which comprises a key top made of hard resin; a key base made of rubber-like elastic body loading the key top on its surface; and a plurality of switch pressuring projections, each of which is made of the same material as that of the key base and extends vertically from a rear surface of the key base opposite to the surface loading the key top, wherein the switch pressuring projections are respectively provided at the position just below the center of the key top and at intersection points of a plurality of concentric circles surrounding the center of the key top and radii of the key top in its inclination directions, and lengths of the switch thrusting projections in the inclination directions are made to be different for the concentric circles.

Structural features of the multi-stage multi-direction-operative key according to the present invention are that the plurality of switch pressuring projections (that is, the multi-stage switch pressuring projections) are provided in one inclination direction of the key top, and the lengths of the projections are different from each other. In addition, each projection is formed of flexible rubber-like elastic body identical to that of the key base. Note that switch elements combined with this multi-stage multi-direction-operative key shall be arranged on a printed circuit board placed below the key base parallelly.

In the multi-stage multi-direction operative key constructed as above, when the key is inclined, the switch pressuring projection having the largest length in a certain inclination direction of the key top first pushes the corresponding switch element. However, since other switch thrusting projections are short, their tips do not touch the corresponding switch elements. If the key top is further inclined, the switch pressuring projection which touched the switch element earlier is crushed due to its elastic deformation, and the projection having the secondly largest length comes to push the corresponding switch element. Accordingly, the number of the switch elements turned on differs depending on the magnitude of force applied to the key top to incline it. Since the number of the switch elements is a multi-value variable having [0, 1, . . . n] as a variable range, the multi-valued signal will be input. Herein, numeral n is the number of the switch thrusting projections (switch elements) in a certain inclination direction of the key top.

DETAILED DESCRIPTION OF THE PREFERRED EMBODIMENTS

Figure 1A:
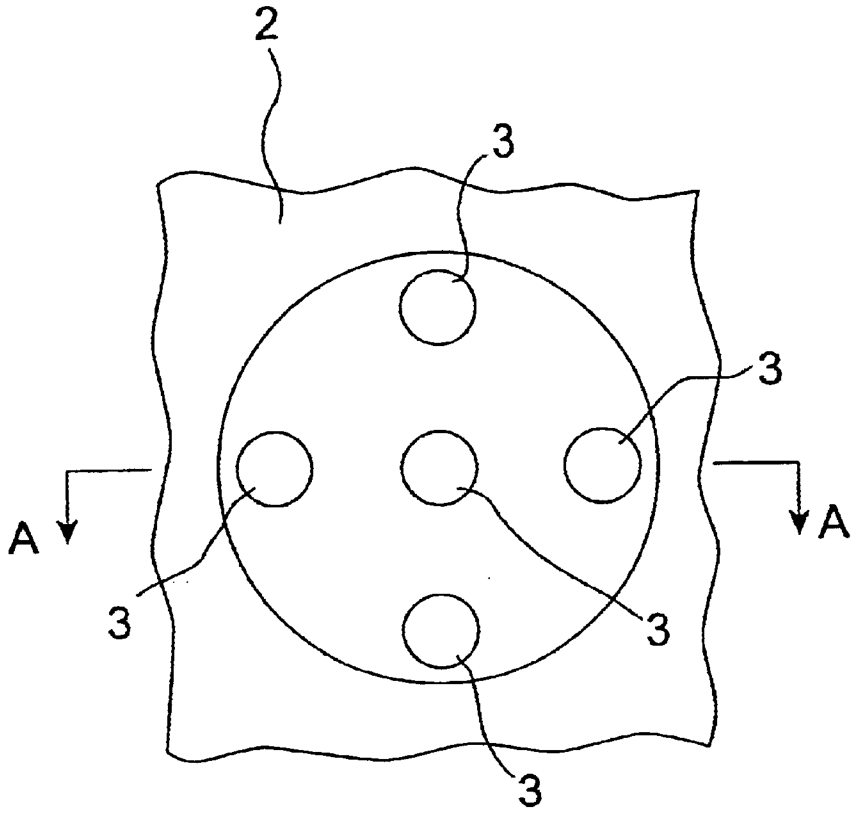
FIG.1A PRIOR ART
FIGS. 1(A) and 1(B) are a back side view illustrating a conventional five-direction-operative key and a side section view of the key.

Hereinafter, preferred embodiments of the present invention will be enumerated. A first embodiment relates to a detection of a speed at which a key top is inclined. Specifically, in a multi-stage multi-direction-operative key switch using a multi-stage multi-direction-operative key according to the present invention, the inclination of the key top is gradually made larger, the switch elements on one switch array are turned on sequentially with a time lag. Accordingly, by measuring the time intervals at which the switch elements are turned on, it is possible to detect the speed at which the key top is inclined. Since the speeds are defined respectively between the first and second switch elements, between the second and third switch elements, . . . , and between the (n−1) and n-th switch elements, these speeds give one or several pieces of analog signals, which are independent from inverting on/off of the individual switch elements. This detection of the speed can be easily carried out by use of a simple time measurement circuit unrelated to the present invention.

A second embodiment of the present invention relates to a form of the switch element used in combination with the multi-stage multi-direction-operative key of the present invention. Specifically, either a metal dome switch 4 or a contact type switch 5 is used, or alternatively both of them are used. The former is the one which allows a fixed contact 6 to close/open by utilizing a deformation of a thin metallic coned disk 7 spring (metal dome) to and inverted shape, the fixed contact being provided on a substrate. The latter is the one which allows a similar fixed contact to contact a metal piece or a line, thus closing/opening the fixed contact, the metal piece being provided in the tip of the switch thrusting projection and the line being drawn with conductive ink.

One of Features of the metal dome switch is that its operation is accompanied with click feeling. However, the diameter of the metal dome is as large as 4 to 5 mm, and the metal dome cannot be arranged at narrow intervals. On the contrary, though the contact type switch can be arrayed at narrower intervals than those of the metal dome switch, its operation is not accompanied with click feeling. Accordingly, the metal dome switch and the contact type switch should be mixedly used properly. For example, when the plurality of switch elements are arrayed on one line, it is desirable that at least one switch element in the switch array uses the metal dome switch and other switch elements use the contact type switch.

EXAMPLES

Descriptions for preferred examples of the present invention will be made with reference to FIGS. 2 to 4 below. In FIGS. 2 to 4, reference numeral 1 denotes a key top; 2, key base loading the key top 1 on its upper plane; and 3, switch pressuring projections formed in a lower plane of the key base 2 which is opposite to the plane loading the key top 1. A switch element is arranged below each of the switch pressuring projections 3 so as to face a tip of each of the switch pressuring projections. However, each of the switch elements is arranged on the plane placed in parallel with the rear plane of the key base 2, and the illustrations of the switch elements are shown in FIG. 2B.

Figure 1B:
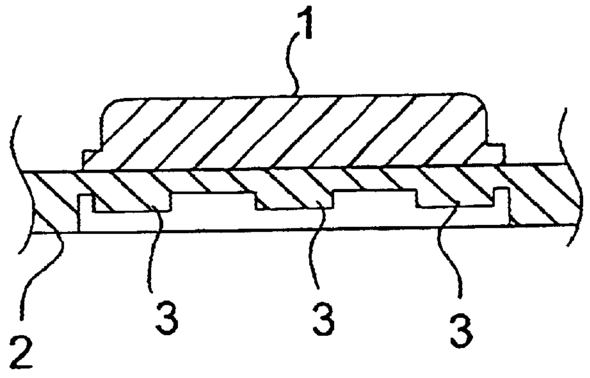
FIG.1B PRIOR ART

FIGS. 1(A) and 1(B) are a back side view and a side section view, which show a conventional five-direction-operative key switch. FIG. 1(A) is a view when the key base 2 including a portion of the five-direction-operative key switch, which is the portion surrounded by a large circle, is viewed from the back side thereof. Among five small circles in the large circle, the circle at the center of the large circle is the switch pressuring projection 3 for vertical push, and the four small circles surrounding at the center of the large circle are the switch pressuring projections 3 for slanting the key top forward and backward and to the left and right. FIG. 1(B) is the side section view taken along the line A—A direction of FIG. 1(A). Right and left break lines of the drawings show that the key base 2 illustrated is linked to other portions. The key top 1 is loaded on the upper plane of the key base 2, and, on the lower plane of the key base 2, the switch pressuring projections 3 for slanting the key top are formed on the left and right sides of the central switch pressuring projection 3 for vertical push.

Figure 2A:
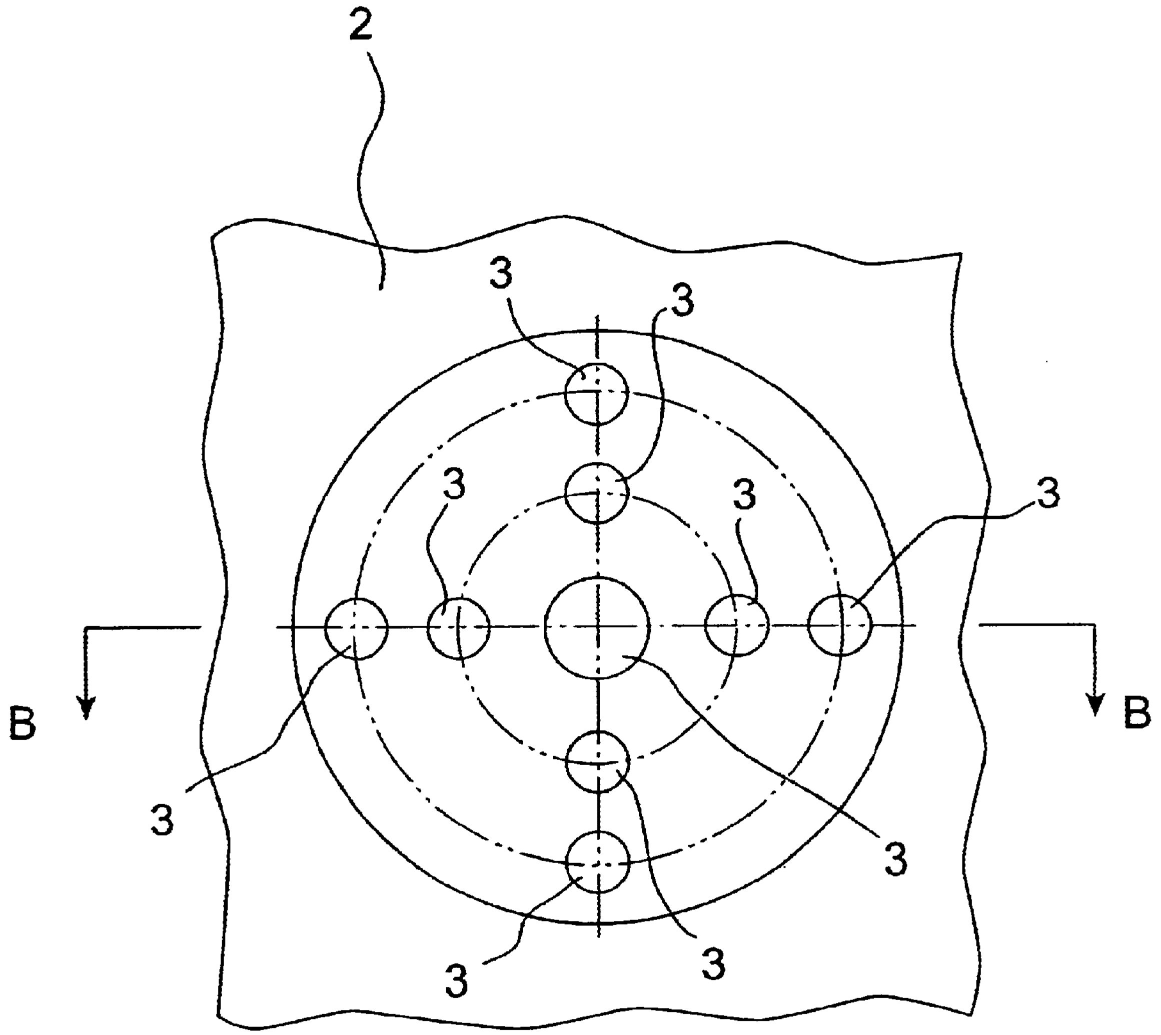
FIGS. 2(A) and 2(B) are a back side view illustrating an example of multi-stage five-direction operative key according to the present invention and a side section view of the key.
Figure 2B:
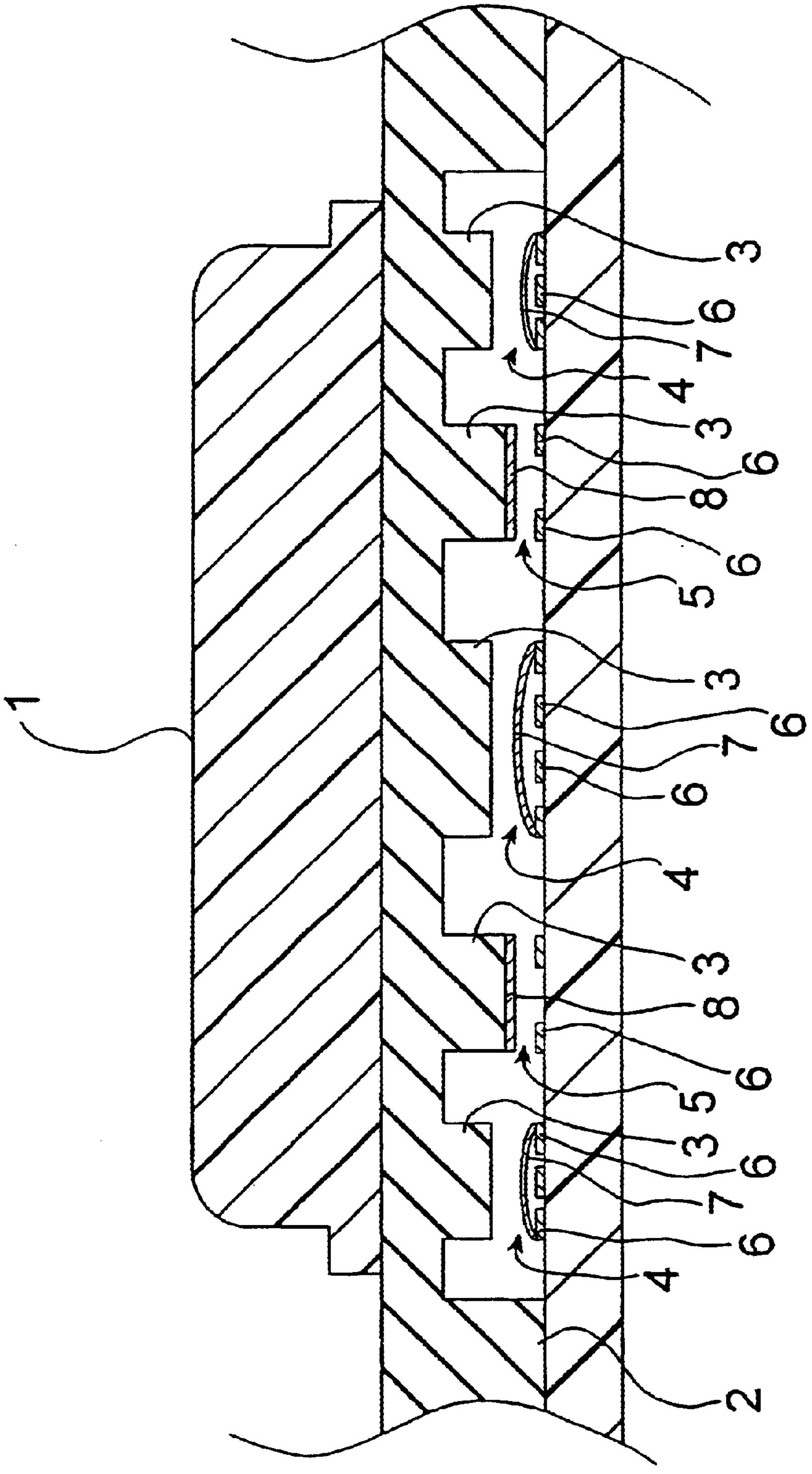

FIGS. 2(A) and 2(B) are a back side view and a side section view, which show a multi-stage five-direction-operative key switch according to the present invention. In the back side view of FIG. 2(A), the circle at the center portion is a switch pressuring projection 3 for vertical push, and the two small circles respectively arranged around the circle at the center portion in the four directions are two-stage switch pressuring projections 3, which respectively correspond to the slanting directions to which the key top 1 is slanted. In the side section view of FIG. 2(B), an appearance in which the lengths of the switch pressuring projections 3 formed on the lower plane of the key base 2 are different from each other is illustrated. In the case of the side section view of FIG. 2(B), the projections 3 closer to the center have longer lengths, and the projections 3 farther from the center have shorter lengths.

Figure 3A:
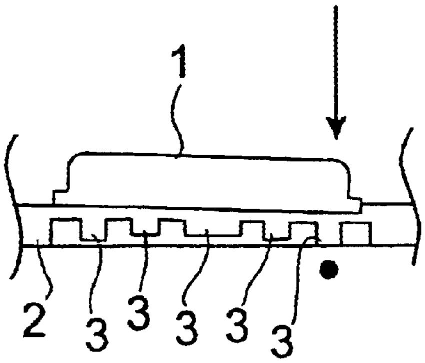
FIGS. 3(A) and 3(B) are a side section view of a two-stage five-direction-operative key according to the present invention, when the key is inclined slightly, and a side section view of the key, when the key is much inclined.
Figure 3B:
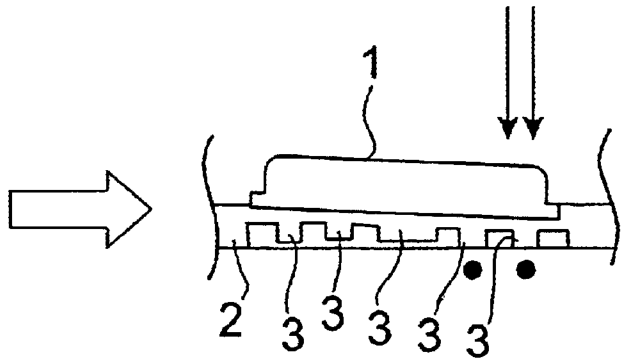
Figure 4A:
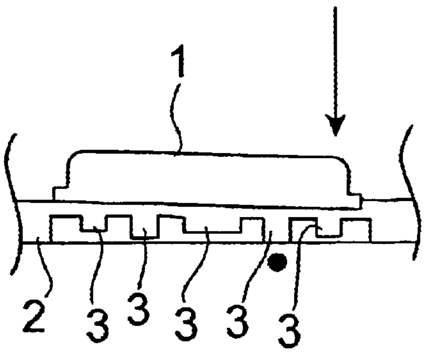
FIGS. 4(A) and 4(B) are a side section view of a two-stage five-direction-operative key according to the present invention, when the key is inclined slightly, and a side section view of the key, when the key is much inclined.
Figure 4B:
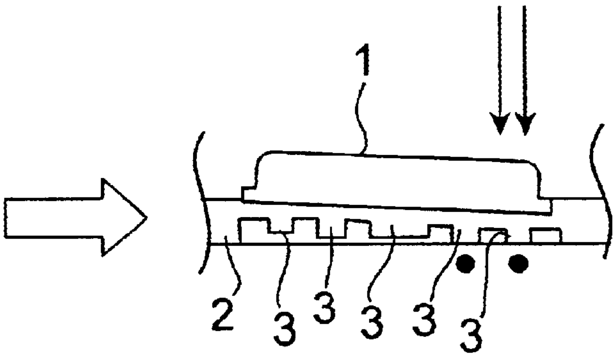

FIGS. 3(A), 3(B) and FIGS. 4(A), 4(B) are side section views showing examples of the present invention. The side section views of FIGS. 3(A), 3(B) and FIGS. 4(A), 4(B) omit hatchings for the sake of easy viewing, and show two kinds of multi-stage multi-direction keys having different structures. The switch pressuring projections 3 shown in FIGS. 3(A) and 3(B), which are provided at the outer portions of the key, have longer lengths than those of the switch pressuring projections 3, which are provided at the inner portions of the key. In FIGS. 4(A) and 4(B), the switch pressuring projections 3, which are provided at the inner portions of the key, have longer lengths than those of the switch pressuring projections 3, which are provided at the outer portions of the key. Specifically, the keys of FIGS. 4(A) and 4(B) have the same structures as those of the keys of FIGS. 2(A) and 2(B). In each drawing, the change appearing in the side section view when the inclination of the key top is made larger gradually is illustrated while comparing the FIGS. 3(A) and 4(A) with FIGS. 3(B) and 4(B).

In FIGS. 3(A), 3(B) and 4(A), 4(B), FIGS. 3(A) and 4(A) shows the case where the key top is slightly inclined to the right (clockwise). In FIGS. 3(A) and 3(B), the external projection 3 pushes the switch element at the position illustrated the black dot. In FIGS. 4(A) and 4(B), the inner projections 3 pushes the switch element at the position illustrated by the black dot. Contrary to this, in FIGS. 3(A), 3(B) and 4(A), 4(B), FIGS. 3(B) and 4(B) show the case where the key top is much inclined to the right (clockwise). In FIGS. 3(B), the inner projection 3 as well as the external projection 3 pushes the switch elements at the positions illustrated by the two black dots, respectively. In FIGS. 4(B), the inner projection 3 as well as the external projection 3 pushes the switch elements at the positions illustrated by the two black dots, respectively.

As described above, in the multi-stage multi-direction-operative key switches illustrated in all of the drawings, as the inclination of the key top is made larger, one switch element is first turned on, and then another one switch element is turned on. Thus, the two switch elements in total are turned on. Accordingly, inputting of multi-valued signals having [0, 1, 2] as a variable range is performed by the manipulation once performed to incline the key top to a certain direction. Moreover, if the speed of the inclination manipulation is detected, an analog signal is additionally input by one.

In the conventional multi-direction-operative key switch, only binary variable signal having [0, 1] as a variable range can be input by the manipulation to incline the key top to a certain direction. Contrary to this, in the multi-stage multi-direction-operative key switch (invention defined in claim 2) using the multi-stage multi-direction-operative key according to the claim 1 of the present invention, it is possible to input the multi-valued signal having [0, 1, . . . n] as a variable range by the manipulation performed once to incline the key top. Herein, numeral n is a set number of the switch pressuring projections in the key top inclination directions and the switch elements arranged so as to correspond the tips of the respective projections.

According to the invention defined in claim 3, since the metal dome switch can be included in the category of switch element in the multi-stage multi-direction-operative key switch, the click feeling can be felt securely in the manipulation to incline the key top.

What is claimed is:

1. A muliti-direction-operative key, comprising:

a key top made of hard resin;

a key base made of rubber-like elastic body loading the key top on its surface; and a plurality of switch pressuring projections, each of which is made of the same material as that of the key base and extends vertically from a rear surface of the key base opposite to the surface loading the key top, wherein the switch pressuring projections are respectively provided at the position just below the center of the key top and at intersection points of a plurality of concentric circles surrounding the center of the key top and radii of the key top in its inclination directions, wherein lengths of the switch pressuring projections in the inclination directions are made to be different for the concentric circles and the speed at which the key top is inclined is detected by measuring the time intervals at which switch elements are turned on.

2. The multi-direction-operative key according to claim 1, wherein the length of the switch pressuring projection provided at an outer portion of the key base is larger than that of the switch pressuring projection provided at an inner portion of the key base.

3. The multi-direction-operative key according to claim 1, wherein the length of the switch pressuring projection provided at the inner portion of the key base is larger than that of the switch pressuring projection provided at the outer portion of the key base.

4. The multi-direction-operative key according to claim 1, wherein switch elements are provided so as to correspond to the respective switch pressuring projections, and among the switch elements, a switch element corresponding to a switch pressuring projection having the largest length is first pushed, and then switch elements corresponding to the switch pressuring projections having shorter lengths are sequentially pushed by elastic deformation of the switch pressuring projections earlier as the key is much inclined.

5. A multi-stage multi-direction-operative key switch, wherein a switch element is provided at a position facing each of the switch pressuring projections with a predetermined distance therebetween, which is apart from a rear plane of the key base in the multi-stage multi-direction-operative key according to claim 1.

6. The multi-stage multi-direction-operative key switch according to claim 5, wherein the switch element includes anyone of a metal dome switch and a contact type switch or both of the metal dome switch and the contact type switch, the metal dome switch allowing a fixed contact to close/open by utilizing a deformation of a thin metallic coned disk spring and the contact type switch allowing the fixed contact provided on a substrate to contact anyone of a metal piece and a line, thus opening/closing the fixed contact, the metal piece being provided in a tip of the switch pressuring projection and the line being drawn with conductive ink.

7. The multi-stage multi-direction-operative key switch according to claim 5, wherein when the switch elements are arrayed on one line plurally in number, a metal dome switch is used for at least one of the switch elements, and a contact type switch is used for other switch elements.

* * * * *